Nov. 29, 1932.  R. E. GARDINER  1,889,469
CALF FEEDER
Filed June 29, 1931
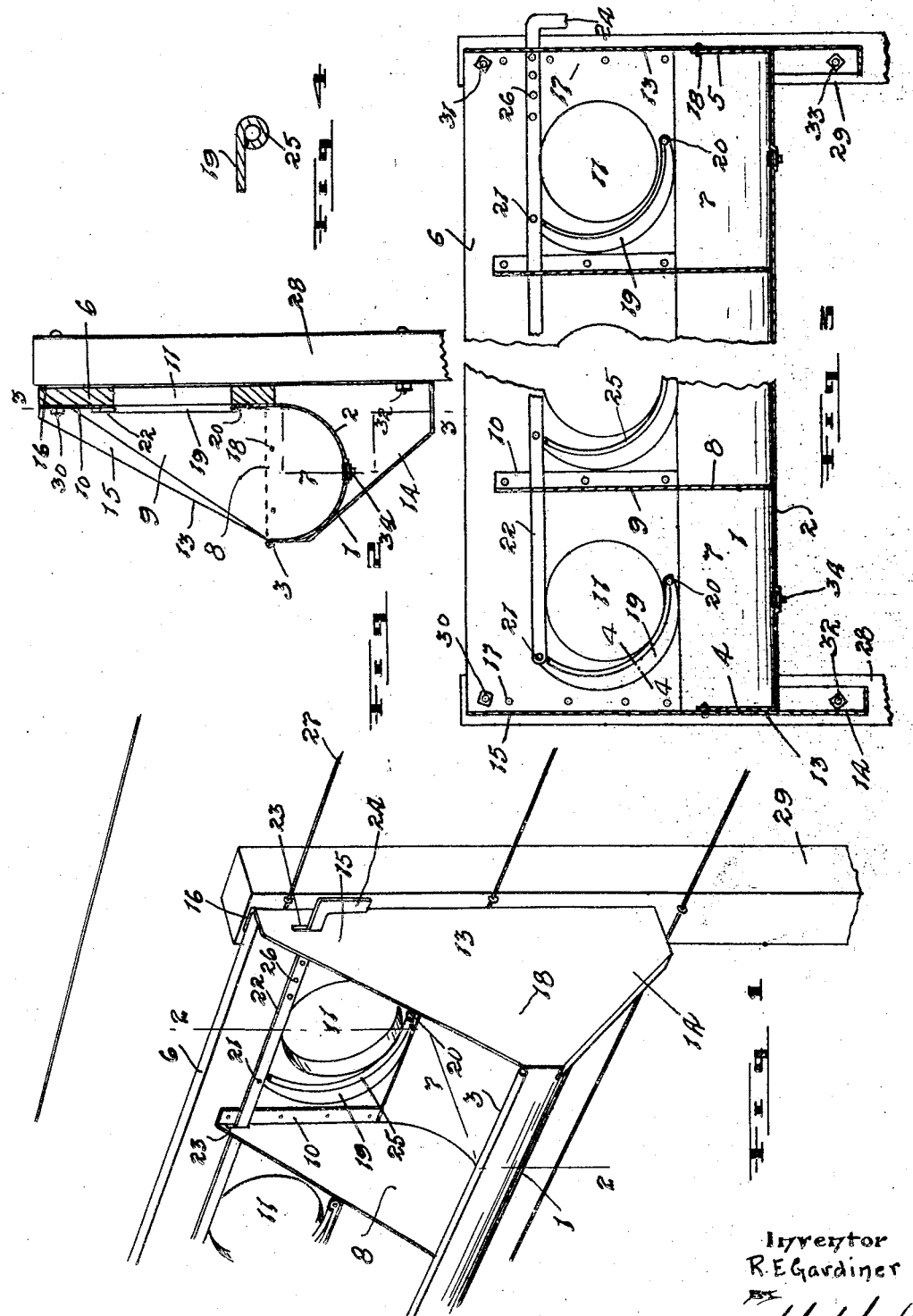
Inventor
R. E. Gardiner Patented Nov. 29, 1932

1,889,469

UNITED STATES PATENT OFFICE

ROBERT E. GARDINER, OF GOLDEN STREAM, MANITOBA, CANADA, ASSIGNOR OF ONE-FOURTH TO BERYL CLIFFORD MILLS, OF WINNIPEG, MANITOBA, CANADA

CALF FEEDER

Application filed June 29, 1931. Serial No. 547,613.

The invention relates to improvements in a device for feeding young animals such as calves and an object of the invention is to provide a feeder for receiving a liquid such as milk and which is arranged so that each animal will only obtain an allotted amount of food and cannot get at the food of the other animal, such insuring that all animals will be effectively fed.

A further object is to construct a feeder which entirely dispenses with the present use of individual feeding pails and their incident troubles and which allows one person to feed at one time a number of animals and requiring to give no further attention to those animals than that of placing the food in the feeder.

A further object is to provide a feeder which can be readily moved from one place to another as occasion demands such as for winter and summer feeding and further a feeder which is constructed so that it will withstand considerable abuse without being damaged.

A further object of the invention is to construct the feeder so that the several feeding compartments can be readily cleaned when desired and further to provide a means for holding the neck of any feeding animal so that it cannot withdraw, such means insuring that the animal cannot molest any other animal during feeding time and that all animals will naturally drink the food provided for them.

A further object is to construct the mechanism for locking the animals' necks in a simple and durable manner and so that all the animals can be concurrently secured or released.

With the above more important objects in view, the invention consists essentially in the arrangement and construction of parts hereinafter more particularly described, reference being had to the accompanying drawing, in which:—

Fig. 1 is a perspective view of one end of the feeder.

Fig. 2 is a vertical cross sectional view at 2—2 Figure 1.

Fig. 3 is a vertical longitudinal sectional view at 3—3 Figure 2, the centre of the trough being broken away and removed.

Fig. 4 is an enlarged detailed cross sectional view at 4—4 Figure 3.

In the drawing like characters of reference indicate corresponding parts in the several figures.

A trough 1 of any suitable length is provided, this being formed from a semicircular body portion 2 having the forward edge thereof suitably reinforced as indicated at 3 and the ends thereof closed by end pieces 4 and 5 soldered to the body. The rear edge of the trough extends slightly higher than the front edge and is fastened in any suitable manner to a rear horizontally disposed support in the form of a relatively wide board 6.

The trough is divided into a number of separate feeding compartments 7 by sheet metal partitions 8 which have their lower ends soldered to the trough body and their upper ends extended to provide triangular shaped guard wings 9, the wings being supplied with rear flanges 10 riveted or screwed to the board. The board is provided with a number of similar circular openings or holes 11, there being a hole centrally to the rear of each compartment, the hole in each instance being sufficiently large to permit the head of an animal, say a calf, to pass through and drink from the compartment. Similar right and left reinforcing end plates 13 are also provided, these being extended downwardly to provide supporting legs 14 and upwardly to provide end wings 15 similar to those 9 and the rear edges of the plates are flanged at 16, the flanges being riveted or bolted as indicated at 17 to the ends of the board. The bodies of the plates are also riveted as indicated at 18 to the end pieces of the trough.

Associated with each hole 11, I provide means for holding the inserted head of an animal from withdrawal from the compartment, such means serving to effectively prevent any animal from molesting any other animal at feeding time and also insuring that the animal will continue feeding until the food in the trough is finished.

The means provided comprises a plurality of similar arcuate locking arms 19 having their lower ends pivotally attached to the board at 20 and their upper ends pivotally fastened at 21 to a horizontally disposed shifting bar 22 which passes slidably through suitable guiding slots 23 provided in the wings. One end of the bar is formed into a handle 24 so that all the locking arms can be simultaneously swung in a direction across the holes by pulling in an outward direction on the handle.

In order that the arms 19 will not injure the necks, I have provided the sides thereof next the holes with rolled edges 25. The bar adjacent the end plate 13 is provided with a series of adjusting holes 26.

Normally the locking arms lie clear of the holes as best shown in Figure 3, this permitting the animal to enter its head through the hole at feeding time and drink from the trough. After the animals have entered their heads, the attendant will pull the bar 22 in a direction to cause the arms to engage the necks of the animals and lock their heads against withdrawal and the bar will be held in locked position by inserting a bolt (not herein shown) through one of the holes 26, the bolt engaging with the outer face of the plate 13.

The device is readily set up in the field or barn by bolting it to any suitable support. When used in the field, I have found it very convenient to locate the trough to the outer side of say a wire fence indicated generally by the reference numeral 27 which encloses the animals within a field. Two similar posts 28 and 29 will be driven into the ground to the inner side of the fence and spaced apart a distance approximately equal to the length of the trough. Two bolts 30 and 31 will then be passed through the upper corners of the board and into and through the posts and fastened with nuts and two further bolts 32 and 33 will be passed through the lower ends of the flanges 16 and into and through the posts and provided with nuts.

When the device is so set up, it is an easy matter for the attendant to pour the desired quantity of milk or other food into the several compartments without entering the field and then after the animals, such as calves, have commenced to drink, they will be locked against withdrawing their heads by manipulating the shifting bar in the manner already disclosed.

It will be particularly noted that by locking the heads from withdrawal, no animal is able to molest any other animal and the animal is held until it has completed feeding and accordingly each animal gets its allotted amount of food. The wings confine each animal to his own compartment as will be readily apparent. After all animals have finished feeding, the locking arms will be released.

The various compartments are provided with draw off plugs 34 so that they can be readily cleaned or scalded as occasion demands.

It will be observed that the whole device can be readily removed from the posts by undoing the bolts and then carrying it bodily to any other location where it is desired to use it at which point it can be again fastened in place by utilizing the bolts to fasten it to a supporting structure.

The feeder can be provided with any desired number of compartments and feed openings similar to those described, it being simply a matter of making the trough shorter or longer as occasion demands and duplicating the other parts to provide the necessary number of feeding compartments and locking arms. The plates 13 provide very strong ends for the device and give ample bearing areas on the posts and they also prevent any animal from reaching through the fence and drinking out of the end compartment.

What I claim as my invention is:—

1. A portable calf feeder comprising a horizontally disposed sheet metal trough having closed ends, spaced metal partitions crossing the trough and permanently secured thereto and forming therewith a plurality of liquid tight feeding compartments, said partitions being extended above the trough to provide guard wings between compartments and a back board rising from the rear side of the trough and secured to the rear edges of the wings, said board being provided with a number of similar spaced openings therein, each of a size to permit an animal to pass its head therethrough to feed from the adjoining compartment.

2. A portable calf feeder comprising a horizontally disposed sheet metal trough having closed ends, spaced sheet metal partitions crossing the trough and permanently secured thereto to provide a plurality of liquid tight similar feeding compartments, said partitions each rising above the troughs to provide guard wings and a vertically disposed wooden board rising from the rear side of the trough and fastened to the rear edges of the wings, said board being provided with a plurality of suitably spaced holes opening to the several compartments and of a size to permit an animal to pass its head therethrough to feed from the compartment.

3. A portable calf feeder comprising a horizontally disposed sheet metal trough having closed ends, spaced sheet metal partitions crossing the trough and permanently secured thereto in a manner to provide a plurality of similar liquid tight feeding compartments, said partitions having their upper ends extended to provide triangular shaped guard wings fitted with rearwardly disposed vertical flanges and a vertically disposed wooden board extending the length of the trough and rising from the rear side thereof and fastened to the flanges, said board being provided with a plurality of similar spaced openings, there being an opening leading to each compartment and of a size to permit an animal to pass its head therethrough.

4. A portable calf feeder comprising a horizontally disposed sheet metal trough semicircular in cross section, vertically disposed end plates permanently closing the ends of the trough and rising thereabove to provide end wings rearwardly flanged, a plurality of similar sheet metal spaced partitions crossing the trough and permanently secured thereto and providing a plurality of similar liquid proof feeding compartments, said partitions rising above the trough to provide guard wings between compartments and said wings being rearwardly flanged and a wooden board rising from the rear side of the trough and fastened to the former and the latter wings, said board being provided with a plurality of similar openings of a size to permit an animal to enter its head through the opening to feed from a compartment.

5. In a calf feeder, an all metal unit embodying a trough and partitions crossing the trough and dividing the same into a plurality of liquid tight feeding compartments and having the partitions extending upwardly above the trough to provide guard wings between compartments and a wooden lengthwise extending and vertically positioned board located at the rear side of the trough and fastened to the rear edges of the wings, said board being supplied with entrance openings passing therethrough and opening to the respective compartments and of a size to permit of the passage of an animal's head therethrough.

6. In a calf feeder, a horizontally disposed sheet metal trough having closed ends, spaced sheet metal partitions crossing the trough and permanently secured thereto to provide a plurality of similar liquid tight feeding compartments, said partitions rising above the trough in the form of guard wings having rear attaching flanges and a board rising from the rear side of the trough and secured to the flanges, said board being provided with a plurality of entrance openings opening to the compartment and of a size to permit of the entrance of an animal's head.

Signed at Winnipeg this 6th day of February, 1931.

ROBERT E. GARDINER.